(12) United States Patent
Sakagami

(10) Patent No.: US 8,015,424 B2
(45) Date of Patent: *Sep. 6, 2011

(54) PORTABLE INFORMATION PROCESSING APPARATUS AND METHOD OF THE SAME

(75) Inventor: Yasuhiko Sakagami, Tokyo (JP)

(73) Assignee: Sony Corporation, Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 12/200,987

(22) Filed: Aug. 29, 2008

(65) Prior Publication Data

US 2009/0013202 A1 Jan. 8, 2009

Related U.S. Application Data

(60) Division of application No. 11/608,613, filed on Dec. 8, 2006, now Pat. No. 7,434,075, which is a continuation of application No. 10/184,899, filed on Jul. 1, 2002, now Pat. No. 7,178,042, which is a continuation of application No. 09/088,763, filed on Jun. 2, 1998, now Pat. No. 6,449,724.

(30) Foreign Application Priority Data

Jun. 3, 1997 (JP) .................... P9-144941

(51) Int. Cl.
*G06F 1/26* (2006.01)
*G06F 1/32* (2006.01)
(52) U.S. Cl. ........... 713/323; 713/300; 713/324; 710/14
(58) Field of Classification Search .................. 713/300, 713/323, 324; 710/14
See application file for complete search history.

(56) References Cited

U.S. PATENT DOCUMENTS

| 5,457,478 A | 10/1995 | Frank |
| 5,504,658 A | 4/1996 | Matsuda et al. |
| 5,579,524 A | 11/1996 | Kikinis |
| 5,634,798 A | 6/1997 | Suh |
| 5,832,285 A * | 11/1998 | Shimada ........................ 713/323 |
| 5,838,983 A | 11/1998 | Atkinson |
| 5,850,560 A | 12/1998 | Kang |
| 5,978,923 A * | 11/1999 | Kou ............................... 713/323 |
| 6,006,285 A | 12/1999 | Jacobs et al. |
| 6,006,337 A | 12/1999 | Koo |
| 6,545,668 B1 | 4/2003 | Hayama |

FOREIGN PATENT DOCUMENTS

| EP | 04-75297 | 3/1992 |
| JP | 02-55797 | 4/1990 |
| JP | 04-117654 | 4/1992 |
| JP | 04-209056 | 7/1992 |
| JP | 04-309110 | 10/1992 |
| JP | 04-364266 | 12/1992 |
| JP | 09-026832 | 1/1997 |
| JP | 09-101848 | 4/1997 |
| JP | 10-27412 | 2/1998 |

* cited by examiner

*Primary Examiner* — Vincent T Tran
(74) *Attorney, Agent, or Firm* — Oblon, Spivak, McClelland, Maier & Neustadt, L.L.P.

(57) ABSTRACT

The present invention relates to a portable information apparatus which can realize electrical power for a longer period of time. Under the condition that the suspending mode is set, when an exclusive key is manipulated, a switch monitoring circuit detects this condition and issues an interruption to the CPU. In this timing, the CPU supplies the necessary electrical power to the CD-ROM controller, CD-ROM drive and audio circuit which are required for reproduction of CD. Thereby, a CD can be reproduced under the suspending mode.

6 Claims, 8 Drawing Sheets

F I G. 2
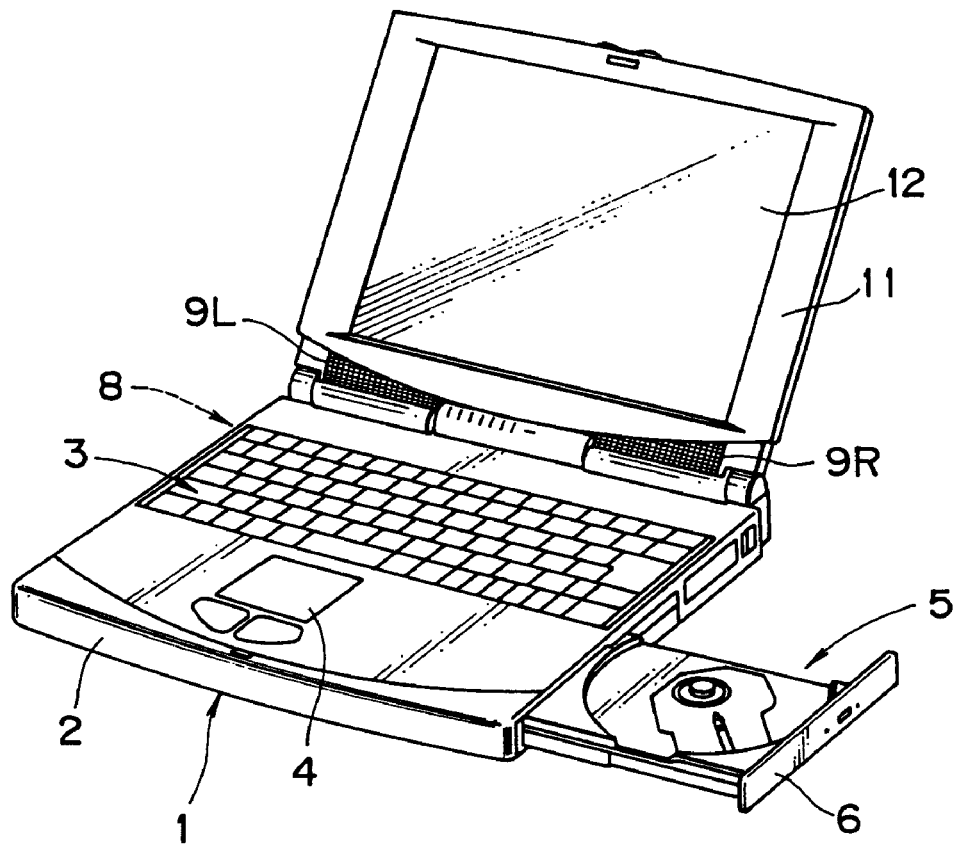

F I G. 3
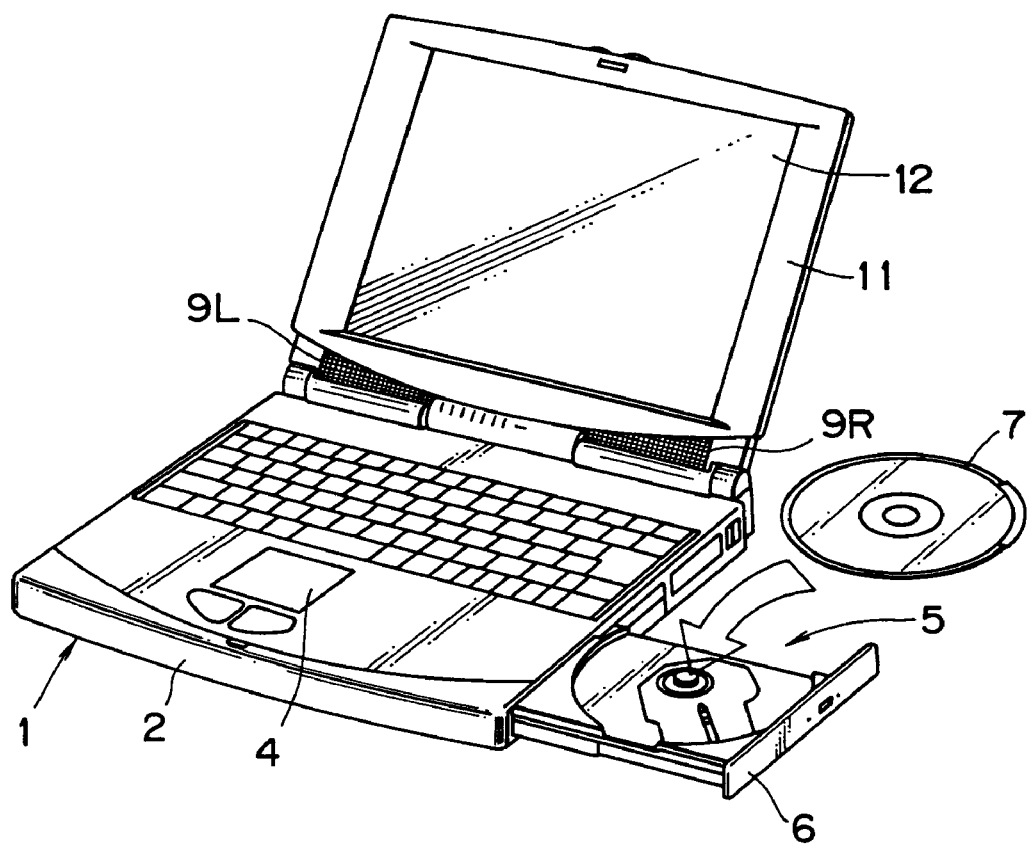

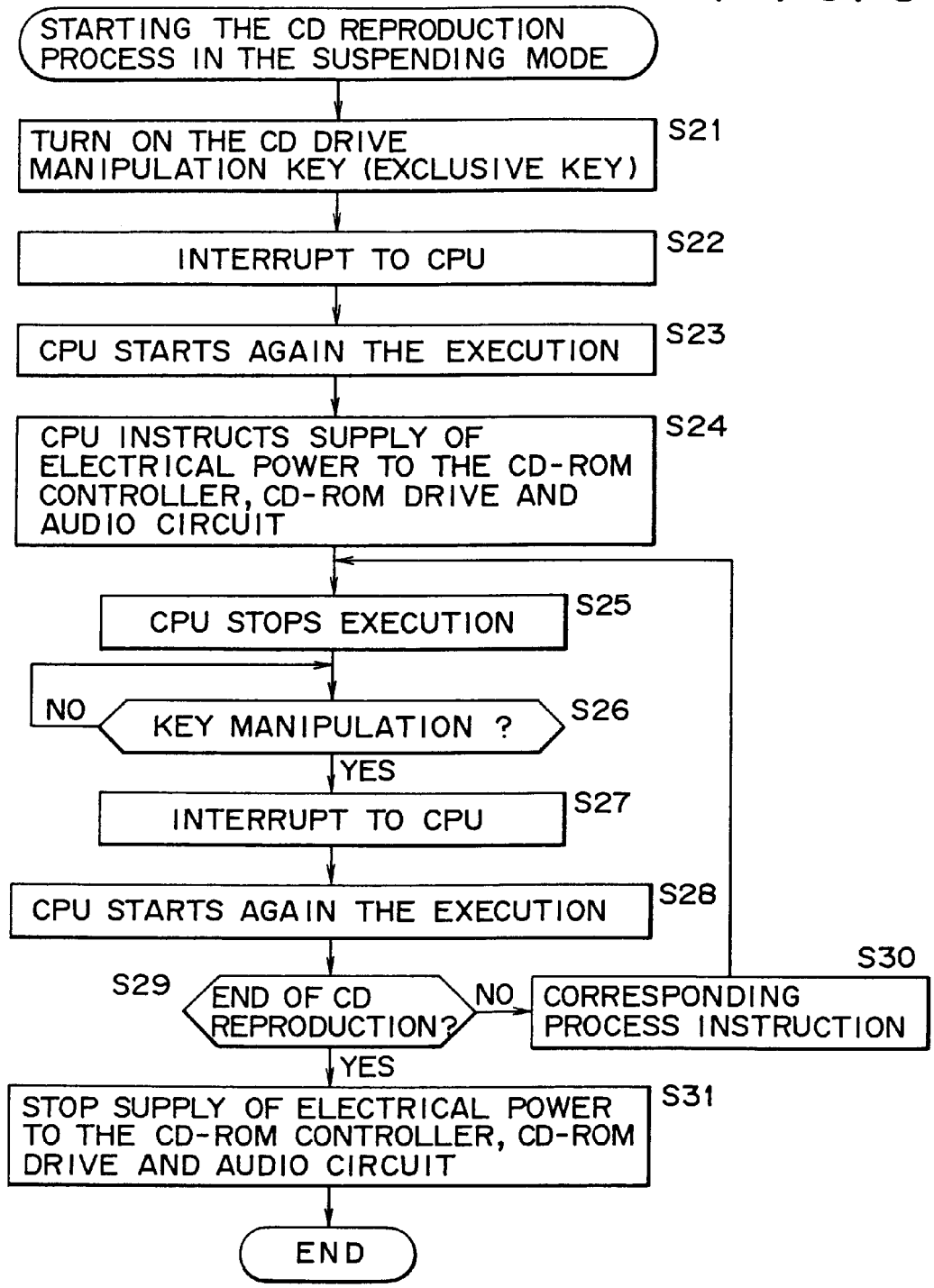

PORTABLE INFORMATION PROCESSING APPARATUS AND METHOD OF THE SAME

CROSS-REFERENCE TO RELATED APPLICATIONS

This application is a division of U.S. application Ser. No. 11/608,613, filed Dec. 8, 2006, which is incorporated herein by reference. U.S. application Ser. No. 11/608,613 is a continuation of U.S. application Ser. No. 10/184,899, now U.S. Pat. No. 7,178,042, filed Jul. 1, 2002, which is a continuation of U.S. application Ser. No. 09/088,763, now U.S. Pat. No. 6,449,724, filed Jun. 2, 1998, based upon and claims the benefit of priority from the prior Japanese Patent Application No. P09-144941, filed Jun. 3, 1997, and is related to JP09-139271, filed May 21, 1998.

BACKGROUND OF THE INVENTION

1. Field of the Invention

The present invention relates to a portable information processing apparatus and a method of controlling the same.

2. Description of the Related Art

In a portable personal computer, a built-in battery supplies the necessary electrical powers to each section. It has also been proposed to provide a suspending mode (sleeping mode) so that the battery can supply the electrical power as long period as possible.

A user sets the suspending mode in such a case that a user does not use the portable personal computer for a while. The suspending mode is set, operation of CPU is basically stopped in the portable personal computer. Moreover, supply of electrical power to each section is basically stopped, except for the supply of electrical power to a part of the circuits which requires backup service of electrical power.

When the suspending mode is set, a user can no longer process the predetermined information using such portable personal computer. For example, even when the relevant portable personal computer has the function to play a CD (Compact Disc), this portable personal computer cannot play a CD under the condition that the suspending mode is set. Therefore, a user is requested to cancel the setting of the suspending mode to play a CD for reproduction of data. When playing of CD is instructed after canceling the suspending mode, a button icon, etc. which is required for playing of CD, as shown in FIG. 1, is displayed on an LCD of the portable personal computer. A user is now capable of playing a CD by adequately manipulating this button icon with a mouse, etc. The CPU supplies the electrical power to the entire sections of the portable personal computer when the suspending mode is canceled to realize the playing of a CD.

As explained, since the relevant portable personal computer is requested to cancel the suspending mode, when a CD is played from the condition that the suspending mode is being set, the electrical power is also supplied to a part which is not required for playing of a CD and the electrical power of the battery has been consumed unnecessarily, resulting in a problem that it is difficult to use the battery for a longer period of time.

SUMMARY OF THE INVENTION

The present invention has been proposed considering the background explained above and it is therefore an object of the present invention to control that electrical power of a battery is unnecessarily consumed and thereby a battery can supply its electrical power for a longer period of time.

An offered medium described in the present invention is characterized in providing a program comprising a setting step for setting the suspending mode, a limiting step for limiting supply of electrical power from a battery when the suspending mode is set, a detecting step for detecting an instruction for reproducing an information recording medium and a supplying step for supplying electrical power to the sections required for reproducing an information recording medium under the suspending mode condition when the instruction for reproducing the information recording medium is detected in the detecting step.

A method of controlling a portable information processing apparatus of the present invention is characterized in comprising a setting step for setting the suspending mode, a limiting step for limiting supply of electrical power from a battery when the suspending mode is set, a detecting step for detecting an instruction for reproducing an information recording medium and a supplying step for supplying electrical power to the sections required for reproducing an information recording medium under the suspending mode condition when the instruction for reproducing the information recording medium is detected in the detecting step.

A portable information processing apparatus of the present invention is characterized in comprising a setting means for setting the suspending mode, a limiting means for limiting supply of electrical power from a battery when the suspending mode is set, a detecting means for detecting an instruction for reproducing an information recording medium and a supplying means for supplying electrical power to the sections required for reproducing an information recording medium under the suspending mode condition when the instruction for reproducing the information recording medium is detected in the detecting step.

In an offered medium, a method of controlling a portable information processing apparatus and a portable information processing apparatus of the present invention, when an instruction for reproducing an information recording medium is detected in the suspending mode, electrical power is supplied to the sections required for reproduction of an information recording medium in the suspending mode condition.

As explained above, according to an offered medium, a method of controlling an information processing apparatus and a portable information processing apparatus of the present invention, when reproduction of the information recording medium is instructed under the suspending condition, electrical power is supplied to the sections required for reproduction of the information recording medium in view of supply electrical power from a battery for a longer period of time.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 2 is a perspective view showing an external structure of a portable personal computer to which the present invention is applied;

FIG. 3 is a perspective view showing an external structure of a portable personal computer to which the present invention is applied;

FIG. 9 is a flowchart for explaining the reproducing process in the suspending mode of a portable personal computer of FIG. 6.

DETAILED DESCRIPTION OF THE PREFERRED EMBODIMENTS

The preferred embodiments of the present invention will be explained below. In this case, however, the corresponding embodiment (only an example) will be additionally described in the parentheses after each means to clear the characteristic of the present invention in view of disclosing the relationship between each means of the present invention and each embodiment thereof. However, it does not mean that this description is not limited to each means.

The portable information processing apparatus described in the present invention is characterized in comprising a setting means (for example, step S3 of FIG. 7) for setting the suspending mode, a limiting means (for example, step S4 in FIG. 7) for limiting supply of electrical power from a battery when the suspending mode is set, a detecting means (for example, step S21 of FIG. 9) for detecting an instruction for reproducing an information recording medium in the suspending mode and a supplying means (for example, step S24 of FIG. 9) for supplying electrical power to a part which is required to reproduce an information recording medium in the suspending mode condition when the instruction for reproducing the information recording medium is detected by the detecting means.

Figure 1:
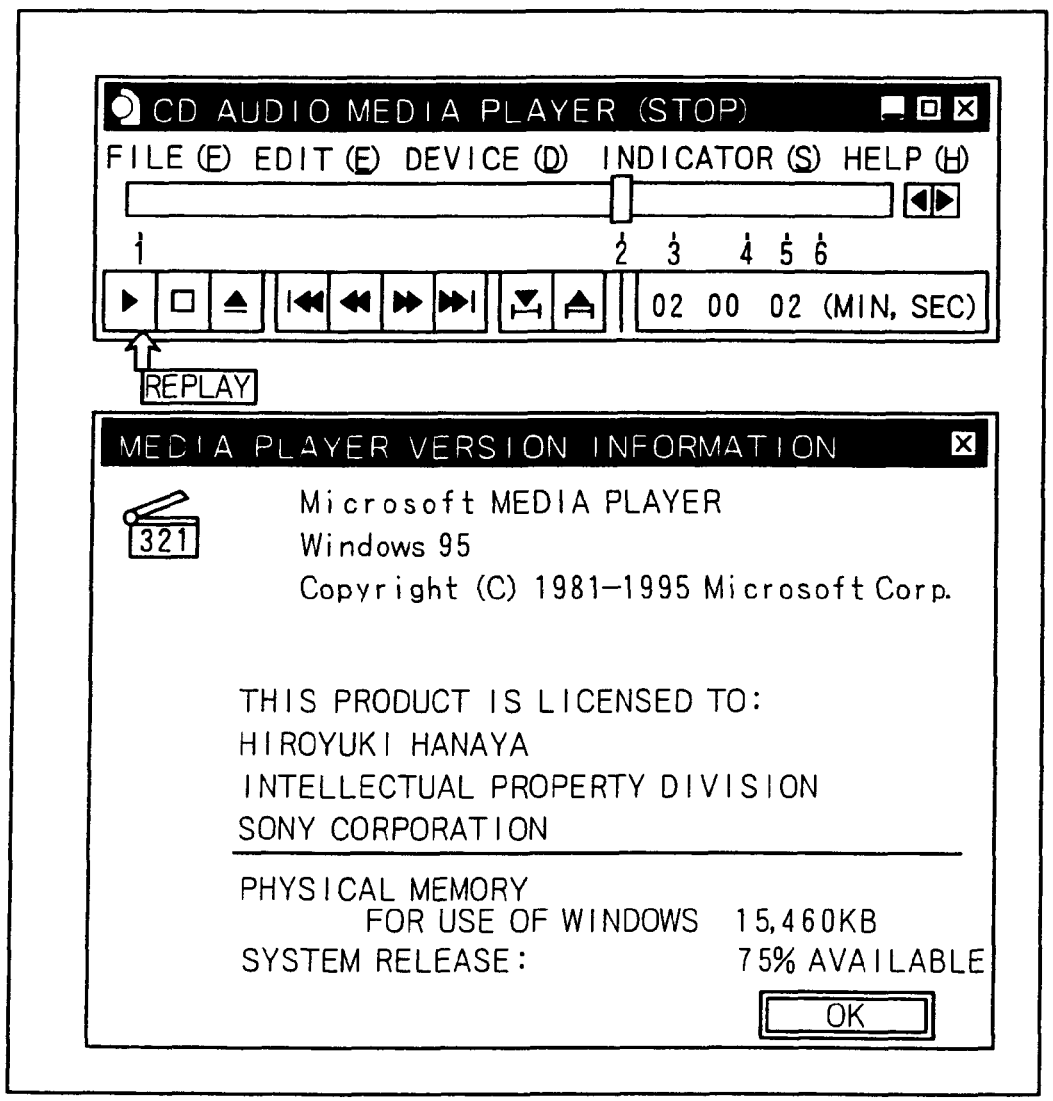
FIG. 1 shows a display example during reproduction of a CD in the related portable personal computer.
Figure 4:
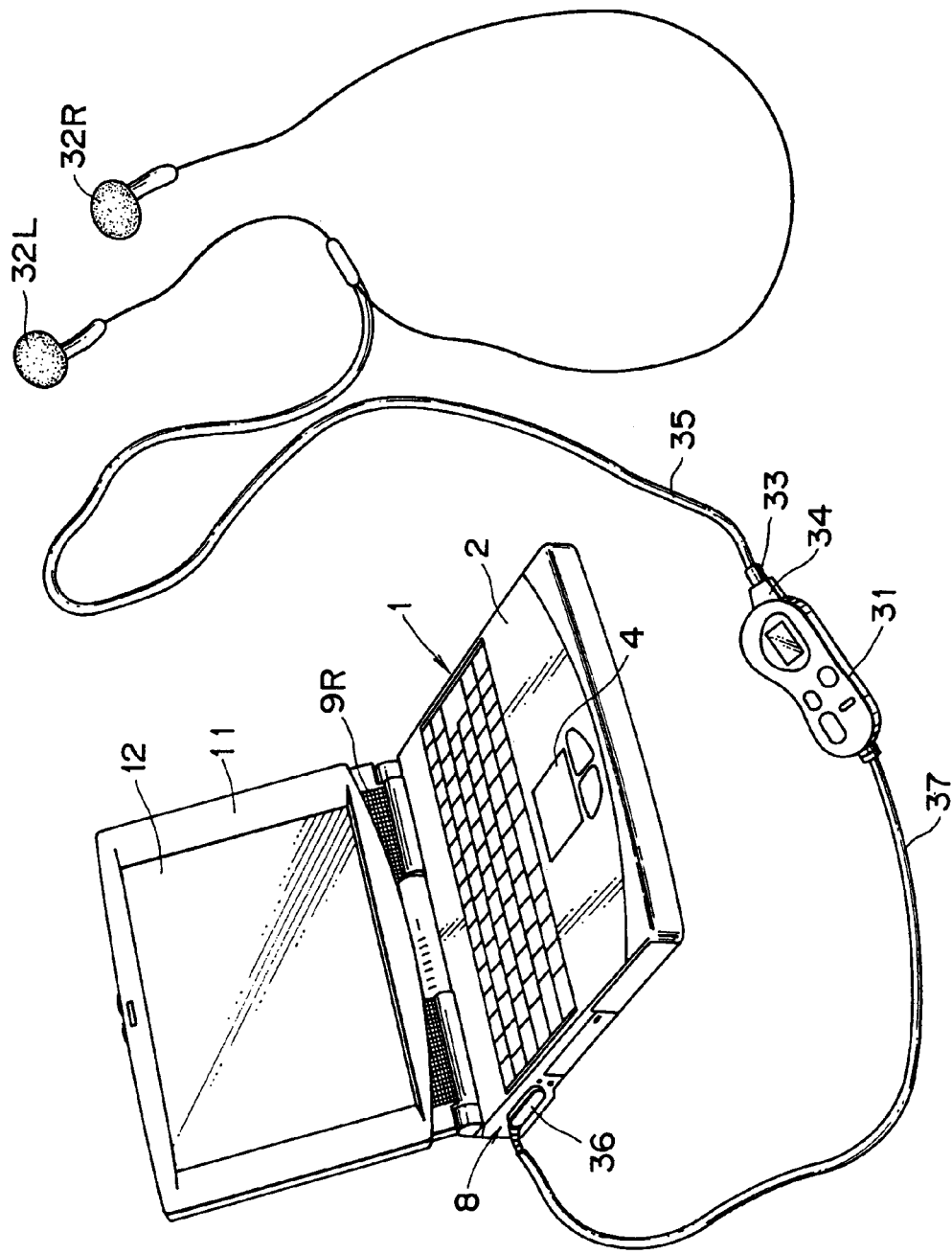
FIG. 4 is a perspective view showing an external structure of a portable personal computer to which the present invention is applied.

FIG. 2 to FIG. 4 show an external structure of a portable personal computer to which the present invention is applied. As shown in these figures, this portable personal computer 1 is composed of a body 2 and a rotating cover 11 which is freely rotated against the body 2. At the upper surface of the body 2, key section 3 which is manipulated for inputting characters and codes, etc. and a touch pad 4 which is manipulated for moving a cursor and executing the defining processes are provided. At the side surface in the left side of the body 2, a CD-ROM drive 5 is provided. A CD-ROM can be loaded to a tray 6 by drawing the tray of the CD-ROM drive 5 from the body (FIG. 3 and FIG. 4). Moreover, at the inverse side (left side) of the CD-ROM drive, a jack 8 is provided (FIG. 2, 4) for connection of a plug 36 (FIG. 4) forming a headphone system. Moreover, at the upper rear surface, speakers 9L, 9R are also provided in the right and left sides.

At the front surface of the rotating cover 11, an LCD 12 is provided and the predetermined characters and images are displayed.

Figure 5:
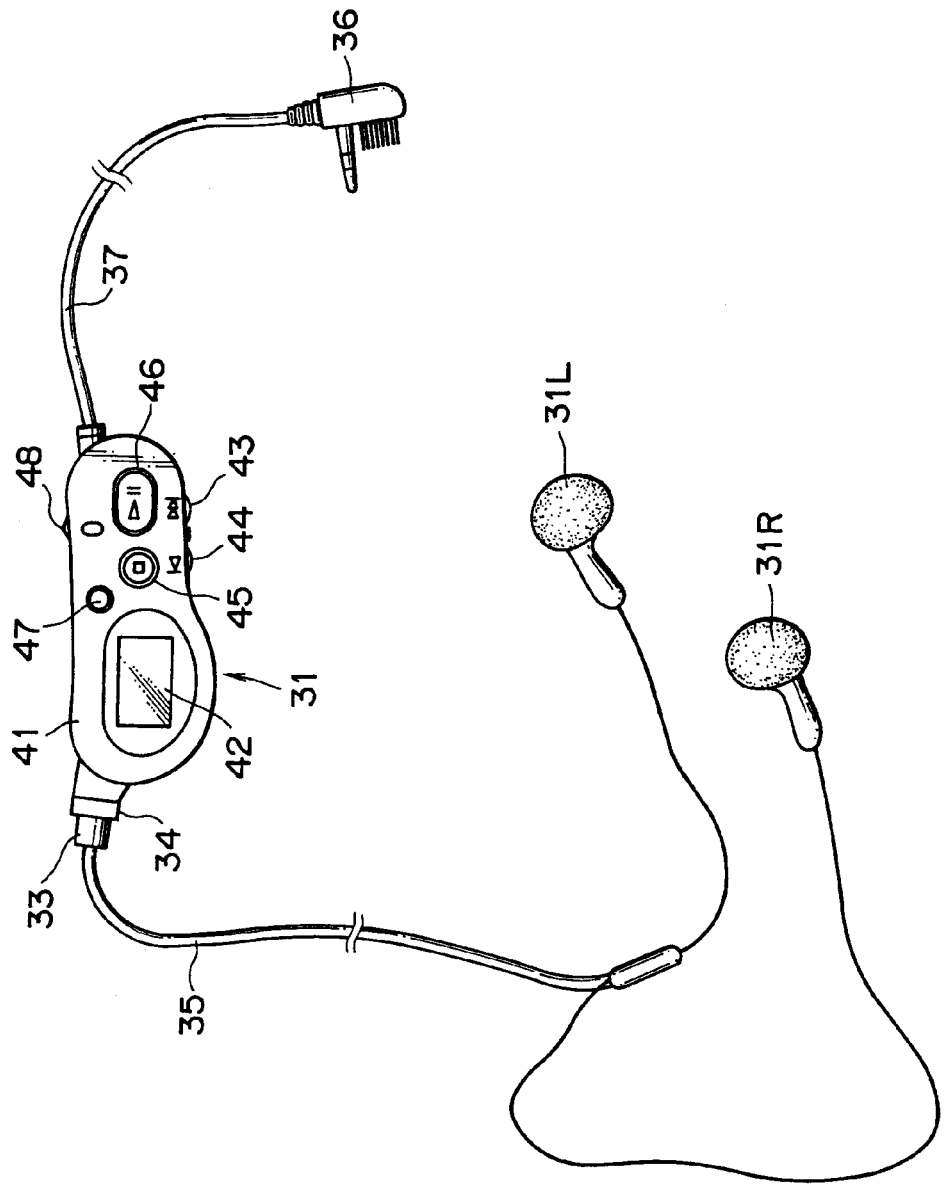
FIG. 5 shows a structure of a headphone system.

FIG. 5 shows a detail structure of the headphone system. In this headphone system, the jack 34 of a remote controller 31 is connected with the plug 33. This plug 33 is connected with right and left headphones 31L, 31R via a lead 35.

In addition, a case 41 of the remote controller 31 is connected with a plug 36 via a lead 37. At the upper surface of the case 41, an LCD 42 for displaying various pieces of information, a PLAY key 46 manipulated for instructing reproduction, a STOP key 45 manipulated for instructing stop of operation and a DSP key 47 are provided.

Moreover, at the side surface of the case 41, an FF key 43 for instructing fast feeding operation, a REW key 44 manipulated for instructing high speed rewinding operation and a hold switch 48 are provided.

Figure 6:
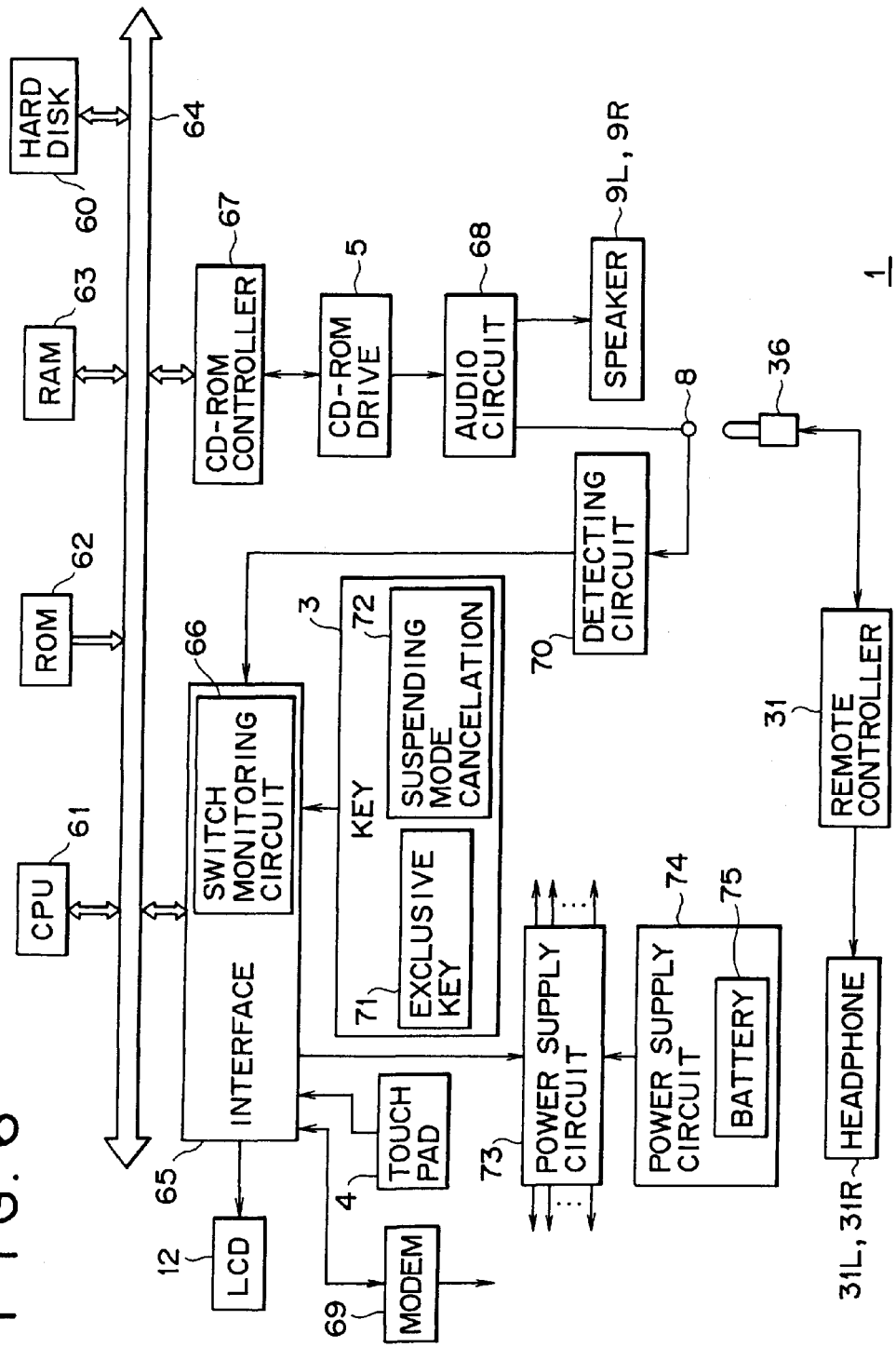
FIG. 6 is a block diagram showing a structure example of a portable personal computer of FIG. 2.

FIG. 6 shows an internal structure example of a portable personal computer 1. CPU 61 executes various kinds of processes depending on the programs stored in a ROM 62. In the RAM 63 and hard disc 60, the data and programs required for executing various processes in the CPU 61 are stored as required. An input/output interface 65 output sand displays the data input via a bus 64 from the CPU 61 to the LCD 12. The interface 65 also controls a power supply circuit 73 to control supply of electrical power to each section from the power supply circuit 74 having a battery 5.

The interface 65 also detects an input from a touch pad 4 and outputs the input to the CPU 61 via the bus 64. In the same manner, when any key 3 is manipulated, the interface 65 outputs a signal corresponding to the key manipulated to the CPU 61 via the bus 64. The predetermined key of the key 3 defines, depending on the assignment of functions to the key, an exclusive key 71 which is manipulated for reproducing a CD in the suspending mode or a suspending mode canceling key 72 manipulated for canceling the suspending mode.

The interface 65 also comprises a switch monitoring circuit 66 to monitor manipulation of exclusive key 71 of the key 3 and a detecting signal of the detecting circuit 70. The detecting circuit 70 detects connection between the plug 36 and jack 8 when the plug 36 is inserted to the jack 8 and then sends the detecting signal to the switch monitoring circuit 66. The switch monitoring circuit 66 outputs an interruption signal to the CPU 61 via the bus 64 when the exclusive key 71 is manipulated or detecting signal is input from the detecting circuit 70 in the suspending mode. A modem 69 is controlled by the CPU 6 via the interface 65 to receive and send the data via the telephone line.

A CD-ROM controller 67 controls the CD-ROM drive 5 corresponding to an instruction input from the CPU 61 in order to play the CD-ROM 7. The data obtained by reproduction of CD-ROM is output to the CPU 61 via the bus 64 from the CD-ROM controller 67.

Moreover, when a CD in which an ordinary music program is recorded is played by the CD-ROM drive 5, the reproduced data is output to an audio circuit 68 for the purpose of demodulating process and error correcting process. Thereafter, the reproduced signal is supplied to the speakers 9L, 9R and it is also supplied to the headphones 31L, 31R via the jack 8.

Figure 7:
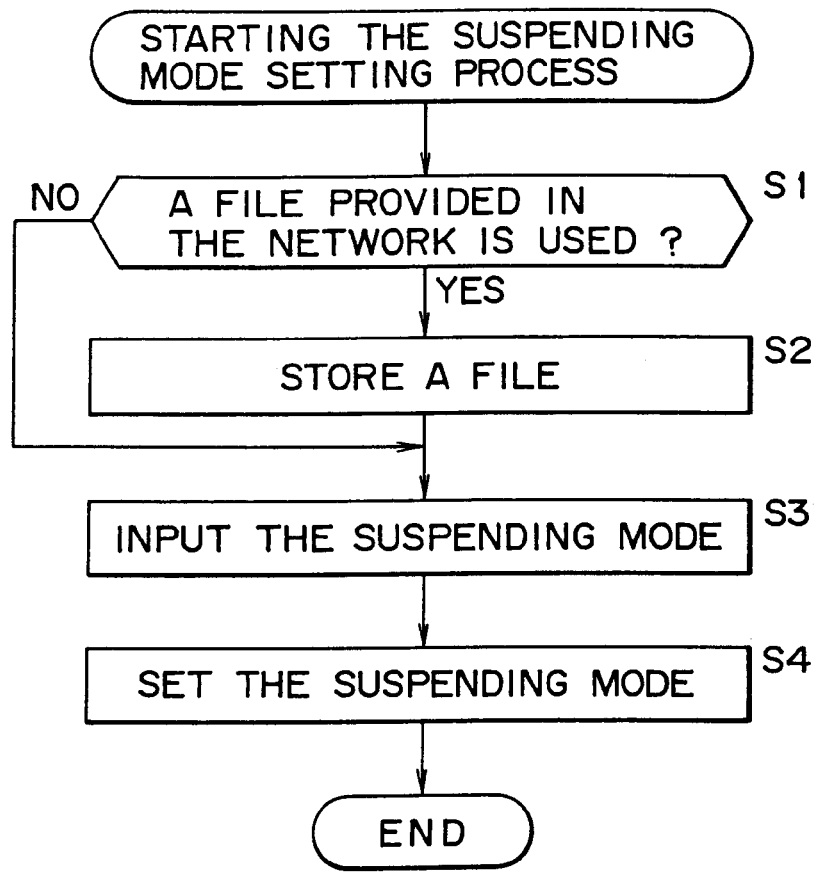
FIG. 7 is a flowchart for explaining the processes for setting the suspending mode of a portable personal computer of FIG. 6.

Next, the process for setting the suspending mode in the portable personal computer 1 is explained with reference to the flowchart of FIG. 7. First, in the step S1, a user judges whether a file in the network is used via a modem 69 or not. When a file is used, the process for storing this file, for example, to the hard disc 60 in the step S2. This process is executed to use the file even if the suspending mode is reset when the connection is canceled because the connection with the network is sometimes canceled when the suspending mode is set. When a file in the network is not used, the process of the step S2 is skipped.

Next, in the step S3, a user instructs and inputs the suspending mode. This input is executed by manipulating the predetermined key among the key 3. For example, on the operating software, Windows 95 (Trademark), this input is executed by selecting the command of "Suspending" from the pull-down menu which is displayed by clicking the "Start" button. In this case, selection is performed via the cursor by manipulating a touch pad 4.

The CPU 61 sets the suspending mode in the step S4 when the suspending mode is input. In this suspending mode, the CPU 61 controls a power supply circuit 73 via the interface 65 to stop the supply of electrical power to each section. In this case, the CPU 61 is stopped to execute the processes. Thereby, nothing is displayed, for example, on the LCD 12, disabling the modem 69 and CD-ROM drive 6. Manipulation of key 3 except for the exclusive key 71 and suspending mode canceling key 72 and manipulation of touch pad 4 are not accepted by the CPU 61. Of course, the CPU 61 cannot execute various kinds of application programs such as word processor and game, etc.

Figure 8:
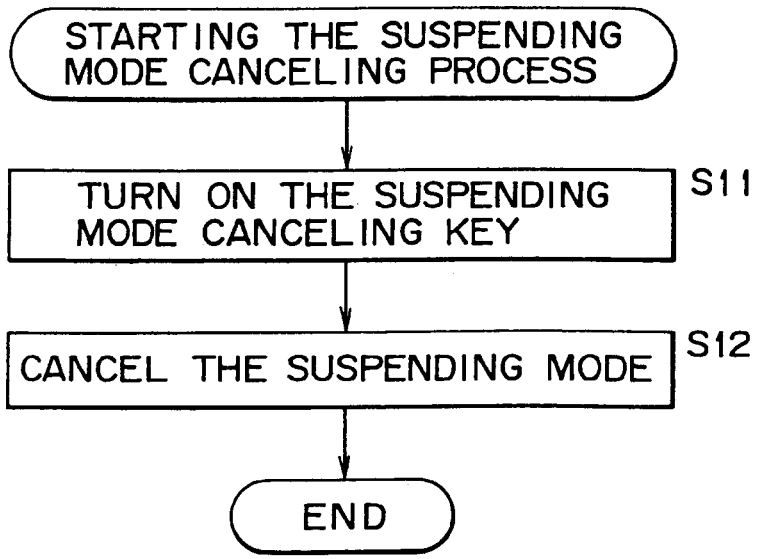
FIG. 8 is a flowchart for explaining the processes for canceling the suspending mode of a portable personal computer of FIG. 6.

As explained above, when the suspending mode is canceled in the condition that the suspending mode is being set, the processes indicated in the flowchart of FIG. 8 are executed.

Namely, first, in the step S11, a user manipulates the suspending mode canceling key 72 of the key 3. This manipulation is transferred to the CPU 61 via the interface 65. Thereby, the CPU 61 starts again the execution in the step S12 and cancels the suspending mode which as been set. In this timing, the CPU 61 controls the power supply circuit 73 via the interface 65 to supply necessary electrical power to each section. Thereby, each section of the portable personal computer 1 is ready for operation. Therefore, a user is capable of making access to the predetermined server from the Internet by executing the word processor or game software or via the modem 69. Of course, the CD-ROM can also be played for reproduction of data.

Next, the process for playing a CD under the suspending mode condition will be explained with reference to the flowchart of FIG. 9. When it is attempted to play a CD in the suspending mode, a user manipulates, in the step S21, the exclusive key 71 for instructing the CD drive operation of the key 3. When the exclusive key 71 is manipulated, the switch monitoring circuit 66 detects manipulation of the key 71. Or, when the plug 36 is connected to the jack 6, the detecting circuit 70 detects the connection and outputs a detection signal to the switch monitoring circuit 66. In any case, the switch monitoring circuit 66 outputs an interruption signal to the CPU 61 in the step S22. In this case, the CPU 61 starts again the execution in the step S23 corresponding to this interruption signal.

In the Step S24, the CPU 61 supplies electrical power only to a part which is required to play a CD among each section of the portable personal computer 1. Namely, CPU 61 controls the power supply circuit 73 via the interface 65 to supply electrical power to the CD-ROM controller 67, CD-ROM drive 5 and audio circuit 68. Thereafter, the CPU 61 stops execution to provide the low power consumption mode in the step S26.

Next, in the step S26, the CPU 61 is in the waiting condition of the low power consumption mode while keeping the execution being stopped until the predetermined key is manipulated among various kinds of keys provided on the remote controller 31. When the predetermined key of the remote controller 31 is manipulated, such manipulation signal is supplied to the switch monitoring circuit 66 via the plug 36, jack 8 and detecting circuit 70. The switch monitoring circuit 66 outputs the interruption signal to the CPU 61 in the step S27 when the manipulation signal is input. In this timing, the CPU 61 starts again the execution in the step S28.

Next, the CPU 61 judges, in the step S29, whether the manipulated key is the STOP key 45 for instructing the end of reproduction of CD or not. If the manipulated key is not the STOP key 45, the CPU 61 executes the process corresponding to the manipulated key in the step S30.

When the PLAY key, for example, is manipulated, the CPU 61 requests playing of CD to the CD-ROM controller 67 via the bus 64. The CD-ROM controller 67 controls, upon reception of this request from the CPU 61, the CD-ROM drive 5 to reproduce this CD. The signal reproduced from the CD is then output to an audio circuit 68 for the demodulation process and error correction process and is then output from the speakers 9L, 9R. Or, the reproduced signal output from the audio circuit 68 is output from the headphones 31L, 31R via the jack 8, plug 36 and remote controller 31.

Thereafter, returning to the step S26, the CPU 61 stops execution and waits for the next key manipulation in the step S26.

In the step S29, when the manipulated key is judged as the STOP key 45, the CPU 61 skips to the step S31 to stop the supply of electrical power to the CD-ROM controller 67, CD-ROM drive 5 and audio circuit 68. Namely, the CPU 61 stops again the supply of electrical power to the circuits to which the electrical power is supplied in the step S24.

As explained above, since electrical power is supplied only to the part required for reproducing a CD under the condition that the suspending mode is being set in this embodiment, consumption of the electrical power during reproduction of CD can be reduced more than that in the case where CD is reproduced by supplying electrical power to the entire portions of the portable personal computer 1. Moreover, since the CPU 61 can be set to the condition for stopping the execution even during the reproduction of CD, power consumption by the CPU 1 (power consumption by the CPU 61 is about a half of the total power consumption by portable personal computer 1) can also reduced. As a result, it is now possible for a battery 75 to supply electrical power to each section for a longer period of time.

In the embodiment explained above, an exclusive key 71 for instructing reproduction of CD in the suspending mode is provided in the key 3, but it is also possible that various keys of the remote controller 31 are defined as the exclusive keys and when these are manipulated, it is detected by the switch monitoring circuit 66 to reproduce the CD.

Moreover, in above embodiment, an example of playing a CD has been explained but the present invention can also be applied to reproduction of the other information recording medium than the CD. Furthermore, the present invention cal also be applied to a portable information processing apparatus other than a portable personal computer.

A program for executing various processes explained above may be recorded on a recording medium such as a floppy disk and CD-ROM disc, etc. and offered to users in direct or through transmission via the network. The offered programs can be stored as required by installing to RAM 63 or hard disc 60.

The invention claimed is:

1. An information processing apparatus, comprising:
a media drive configured to reproduce data from a storage medium;
a first operation key configured, when activated, to change a state of said information processing apparatus from a first operating state to a second operating state, said information processing apparatus configured to execute a predetermined application program when the information processing apparatus is in the first operating state, and said information processing apparatus is configured to stop executing when said information processing apparatus is in the second operating state, the second operating state being (1) a suspension mode and (2) a low power consumption mode where supply of power to the information processing apparatus is lower than power supply to the information processing apparatus during the first operating state;

a second operation key configured, when activated, to change a state of said information processing apparatus from the second operating state to a third operating state, said media drive supplied electrical power during said third operating state, and said information processing apparatus prohibited from executing the predetermined application during the third operating state; and a third operation key configured, when activated during said second operating state, to change the state of said information processing apparatus from the second operating state to the first operating state.

2. The information processing apparatus claimed in claim 1, wherein said information processing apparatus further comprises:

a fourth operation key configured, when activated, to stop the power supply to the media drive during the third operation state.

3. The information processing apparatus claimed in claim 2, wherein said information processing apparatus further comprises:

a fifth operation key configured, when activated, to reproduce data from the storage medium using said media drive during the third operating state.

4. The information processing apparatus claimed in claim 3, wherein said information processing apparatus further comprises:

a remote controller including said third operation key, said fourth operation key, and said fifth operation key arranged thereon.

5. A method for operating an information processing apparatus, comprising:

activating a first operation key to change a state of said information processing apparatus from a first operating state to a second operating state, said information processing apparatus configured to execute a predetermined application program when the information processing apparatus is in the first operating state, and said information processing apparatus is configured to stop executing when said information processing apparatus is in the second operating state, the second operating state being (1) a suspension mode and (2) a low power consumption mode where supply of power to the information processing apparatus is lower than power supply to the information processing apparatus during the first operating state;

activating a second operation key to change a state of said information processing apparatus from the second operating state to a third operating state, supplying a media drive of the information processing apparatus electrical power during said third operating state, and prohibiting said information processing apparatus from executing the predetermined application during the third operating state; and activating a third operation key during said second operating state to change the state of said information processing apparatus from the second operating state to the first operating state.

6. An information processing apparatus, comprising:

means for reproducing data from a storage medium;

means, when activated, for changing a state of said information processing apparatus from a first operating state to a second operating state, said information processing apparatus configured to execute a predetermined application program when the information processing apparatus is in the first operating state, and said information processing apparatus is configured to stop executing when said information processing apparatus is in the second operating state, the second operating state being (1) a suspension mode and (2) a low power consumption mode where supply of power to the information processing apparatus is lower than power supply to the information processing apparatus during the first operating state;

means, when activated, for changing a state of said information processing apparatus from the second operating state to a third operating state, said means for reproducing data supplied electrical power during said third operating state, and said information processing apparatus in a waiting condition prohibited from executing the predetermined application during the third operating state; and means, when activated during said second operating state, for changing the state of said information processing apparatus from the second operating state to the first operating state.

* * * * *